United States Patent [19]

Siegele

[11] 3,879,288

[45] Apr. 22, 1975

[54] PROCESS OF INHIBITING SCALE FORMATION ON WALLS OF STRUCTURES CONTAINING AN AQUEOUS SYSTEM

[76] Inventor: Frederick Herman Siegele, 91 Hillspoint Rd., Westport, Conn. 06880

[22] Filed: Dec. 13, 1972

[21] Appl. No.: 314,630

Related U.S. Application Data

[63] Continuation-in-part of Ser. No. 51,686, July 1, 1970, Pat. No. 3,706,717.

[52] U.S. Cl. .................. 210/58; 252/180; 252/181
[51] Int. Cl. .......................... C02b 5/02; C02b 5/06
[58] Field of Search ....... 252/180, 82, 87, 181, 151, 252/395; 210/58

[56] References Cited
UNITED STATES PATENTS
3,682,224   8/1972   Bleyle ................................ 252/180
3,714,066   1/1973   King et al. ......................... 252/181

*Primary Examiner*—Mayer Weinblatt
*Assistant Examiner*—John D. Smith
*Attorney, Agent, or Firm*—Roland A. Dexter; John L. Sullivan

[57] ABSTRACT

Formation of hard adherent scale deposits of insoluble salts particularly carbonates and sulfates of metals such as calcium or other alkaline earth metals, and/or iron are inhibited, controlled or prevented on, or removed from (a) the walls of evaporators, cooling towers, heat exchangers, boilers and devices where a thermal gradient exists or areas where catalytically active sites induce scale formation in aqueous systems by (b) from about 2/10 to 2,000 parts per million of an aliphatic copolymer of monovinyl compound and a vinyl sulfonate having (c) from about 25 to 75 mol percent of the sulfonate and (d) a molecular weight of about 1,000 to 25,000. The copolymer is useful alone, and in cooperation with corrosion inhibitors, other sequestrants and chelating agents.

2 Claims, No Drawings

PROCESS OF INHIBITING SCALE FORMATION ON WALLS OF STRUCTURES CONTAINING AN AQUEOUS SYSTEM

This application is a continuation-in-part of my copending application Ser. No. 51,686, filed July 1, 1970 and granted as U.S. Pat. No. 3,706,717.

This invention relates to a process of controlling or preventing the formation of adherent deposits of salts from water, particularly during distillation, boiling, evaporation, heat exchanging processes, filtration, flow, circulation and transportation and storage, by the use of a small but effective amount of an aliphatic copolymer having a high content of sulfonate groups and a molecular weight of about 100 to 25,000 and to compositions adapted to be admixed with water for such purposes.

In a broad sense the invention relates to the control of deposits of both comparatively soluble and comparatively insoluble salts. The control of insoluble salts, especially calcium carbonate, and also calcium sulfate, is the most important. Incipient deposits to be controlled may be regarded as (a) temperature induced precipitates as, for example, in heat exchangers and boilers where a thermal gradient exists which tends to increase the rate of deposition; (b) surface-modified deposition in which the surface has active centers which appear to catalytically control the rate of attainment of equilibria and, hence, induce the rapid deposition of insoluble deposits; (c) incrustations in which finely-divided silica or clay particles are incorporated in deposits on surfaces; (d) precipitation induced by a change in conditions such as the pH or concentration of one of the components or by evaporation of water to increase concentrations. Scale formation is increased by a drift in the pH toward such a range in which a component is less soluble, or a change in concentration as, for example, absorption of the carbon dioxide from the air in cooling towers.

The problem of scale formation has its largest application where there are interfacial problems involved. Of particular importance are boilers, pipe lines, heat exchangers, and other thermal transfer equipment made of metal, particularly carbon steel. The results in the present invention are consistant with the theory that a thin monomolecular layer of the low molecular weight polyelectrolyte forms and products, or at least alters the interfacial relationship between the surface and the scale forming elements, so that the tendency of scale to adhere is markedly reduced; and, additionally, the crystal characteristics of precipitating hardness are so altered that the crystals are smaller, frangible, amorphous, poorly formed and more easily removed. Filter media, which may be fiber filter cloths, steel filter cloths, cellulose paper, glass cloth, or synthetic fibers such as nylon or polyester filters (osmotic responsive barriers), or other filter material, appear to have sites which increase the tendency for precipitation.

Scale appears to come out as hard dense crystals on solid surfaces. In the presence of the present copolymers, the precipitates appear amorphous, frangible, and serrated.

The problem of scale formation is a very serious one, both for domestic water supplies, where plumbing is gradually plugged up, and also for steam boilers, where scale once deposited is difficult to remove.

This problem is aggravated, particularly in certain industrial operations such as cooling operations, where waters containing salts, mineral matter, slimes and other sediments even in small quantities are the only waters economically available. In such cases, the alkaline earth compounds which deposit out of the waters tend to cement together the silt or sediment particles as a strongly adherent scale or concretion which causes blockage of and interferes with water flow in industrial processing, such as cooling, heat exchanging, filtering, evaporation, air-conditioning and the like. Compounding such aggravation is the presence of corrosion inhibitors and in some instances highly acidic environments.

The water treatment to prevent or control such deposits consists mainly in maintaining desirable concentrations of chemicals in the water itself. The chemicals to be added and the concentrations thereof which are to be maintained in the water vary with the nature of the operation. The usual agents for inhibiting scale formation are sodium carbonate, sodium phosphates and sodium aluminates. Such chemicals are of a type classified as water-soluble, alkaline-reacting water softening agents, which function so as to impart suitable alkalinity to the water and to effect the formation of a suitable precipitate or sludge in removing the principal "hardness" components, calcium and magnesium salts.

In boiler water treatment processes, vegetable tannin extracts and gums, such as quebracho, processed lignins, and alginates have been employed for many years as sludge conditioning reagents. Such reagents are added to prevent the formation of crystalline precipitates and to improve the fluidity of sludge.

U.S. Pat. No. 2,783,200 teaches dispersing from 0.3 to 20 p.p.m. of water-soluble low molecular weight alkene-carboxylic acid polymers into boiler feed water to condition sludge formation. U.S. Pat. No. 3,463,730 teaches preventing the formation of hard adherent scale by adding small amounts of a hydrolyzed polyacrylamide having from 10 to 50 percent unhydrolyzed amide groups, and preferably from about 20 to about 40 percent. Unfortunately, both teachings do not suggest meaningful solutions to prevention and/or reduction of scale formation in aqueous environments of high acidity, i.e., a pH of 3 or less, high concentrations of hardness and/or presence of corrosion inhibitors such as zinc salts. The materials disclosed in U.S. Pat. Nos. 2,783,200 and 3,463,730 are insoluble in acidic aqueous solutions below about a pH of 3. They are also incompatible and precipitate from solution in the presence of metallic corrosion inhibitors such as zinc. In addition, the presence of high concentrations of calcium, magnesium or barium in combination with these polymers, particularly at elevated temperatures, results in insoluble polymer-salt formation.

The present invention overcomes the foregoing limitations and prevents the formation of hard adherent scale by adding small amounts of an aliphatic copolymer of a monovinyl compound and a vinyl sulfonate having from about 25 mol to 75 mol percent of the sulfonate and preferably about 50 mol percent. Below 25 mol percent the copolymer is no longer suitably effective in acid conditions of pH 3 or in the presence of useful amounts of zinc. The upper limit of 75 mol percent of the sulfonate obtains because of its reduced capacity to modify scale crystals.

In addition to the proportions of sulfonate groups, there is a critical limitation on molecular weight which must be between 1,000 and 25,000 and preferable be about 10,000. Outside these limits the copolymers do not have the essential descaling properties.

The instant invention contemplates the use of low molecular weight polymers which may be defined as the "water-soluble" polymers.

These water-soluble copolymers of a monovinyl compound and a vinyl sulfonate have in the sulfonic acid form the formula:

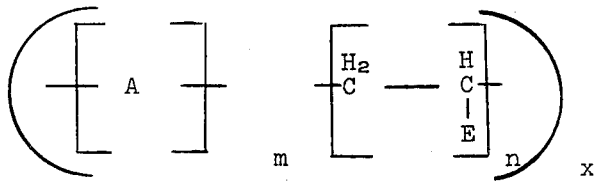

where: A is selected from the group consisting of propylene, acrylamide, acrylonitrile, acrylic acid, methylacrylate, isobutene, methacrylamide, methacrylonitrile, methyl methacrylate, methacrylic acid, 2 carbomethoxy propenoic acid, fumaric acid, and maleic acid; E is selected from $CH_2SO_3H$ or $SO_3H$; $m$ and $n$ are 1, 2, or 3, and, $m$, $n$, and $x$ have such size that the total molecular weight is between 1,000 and 25,000 and $m$ and $n$ occur in random order and orientation.

Conveniently the copolymer is added as an alkali metal salt, usually the sodium salt. Potassium, ammonium or other soluble salts may be used, and all of the acidic hydrogens need not be replaced, nor of those replaced need the cation be the same. As the copolymer is used in dilute solution, and the cation, be it alkali metal or hydrogen, etc., is dissociated to an extent that varies with the concentration of other cations present, the copolymer at the time of action can be considered in a transient state, and for purposes of convenience, the name of the acid form is used for identification without the intention that the copolymer be in such acid form. Also, small numbers of nitriloethylene linkages, from acrylonitrile, or other vinyl compounds may be in the chain without deleteriously affecting the action.

The copolymer is derived as noted from a vinyl compound and a vinyl sulfonate. The vinyl sulfonates include alkali salts of vinyl sulfonic acid and allyl sulfonic acid.

These copolymers can be polymerized by conventional addition polymerization methods in the presence of light, or free radical type initiators. The commercial grades vinyl sulfonates and vinyl compounds are satisfactory for polymerization use. Particularly useful are the peroxide types for it has been observed that hydrogen peroxide is remarkably effective for the copolymerization of the vinyl compound and allyl sulfonate. Other representative peroxides include benzoyl peroxide, benzoyl hydroperoxide, t-butyl peroxide and acetyl peroxide.

The copolymers may be readily hydrolyzed by alkaline or acid hydrolysis in the common procedures for the hydrolysis of polyvinyl acetate to substitute hydroxyl groups for the organic acid ester or amide groups.

The copolymers may be added dry, and permitted to dissolve during use. Alternatively, the polymer can be dissolved in water and added as 0.1 to 50 percent solution for operations in which liquid feeding is more convenient. The Japanese have reported the preparation of copolymers of sodium vinyl sulfonate with acrylamide, vinyl acetate, or sodium acrylate (See Journal of the Chemical Society of Japan 69(7) 1,335–1,346, July, 1966) in order to test their respective flocculant and dispersive properties on pigments, such as kaolin, carbon black and calcium carbonate distributed in an aqueous system.

The copolymer in one specific and preferred embodiment is derived from solution polymerization of one mol of fumaric acid and one mol of the sodium salt of allyl sulfonic acid in the presence of hydrogen peroxide.

The resultant polymeric product is a solid having predominantly a molecular weight of about 10,000 and contains from 50 to 70 mol percent sulfonate and 30 to 50 percent carboxyl. This copolymer is unique in the facility of preparation and effectiveness in scale inhibition perhaps because of optimal separation of its ionic groups. Not all of the known useful properties of the material are here claimed as the material is useful as a drilling mud additive, as a sequestrant, descalant, cement additive, an additive in the electrodeposition of metals, and in heating and air-conditioning equipment, both in circuits which are exposed and in closed systems. It is useful in the evaporation and desalting of sea water, as well as various other brines and is useful in controlling scales and encrustations and a wide variety of chemical processing, including treating hard water, to assist in the control of scale and deposits which are independent of or induced by added chemicals in processing equipment and machinery such as tanks, pipes, pumps, filters, filter media, as a detergent for use with or independent of other detergents and surfactants; in metal cleaning, the processing of ores, including flotation, cyanidation, filtration, to assist in corrosion inhibition, etc. It may be used to assist in dispersing mineral products as may be desired in degritting clay, classification of clay fractions, classification of other minerals such as asbestos, and processing sewage and industrial wastes and in conjunction with other sequestrants, chelating agents, or antinucleating agents in chemical processing or heat exchange. The present low molecular weight water-soluble copolymer is not only effective in its own right as an antiprecipitant, sequestrant and chelating agent, but also is effectively blended with conventional agents used for such purpose with advantage and also corrosion inhibitors such as zinc salts and filming amines.

Sequestrants which give other useful compounds in combination are set forth in conventional texts, such as: Bailar, "The Chemistry of the Coordination Compounds," Reinhold Publishing Corp., New York (1956).

The copolymer is also useful in conjunction with acids or bases used for cleaning deposits from pipes, vessels, tanks, and other locations where deposits already formed, either from calcium carbonate alone, or in conjunction with silt and/or other salts are already in place, and mud removal. A more efficient scavenging of calcium is required where a high carbonate or sulfate concentration is present. In cooling towers, and aerated systems, such concentrations cannot be conveniently reduced, and hence, the highly efficient present concepts of calcium inactivation are more important than in systems where lime may be high, but low carbonate concentration prevents calcium carbonate buildup.

The copolymer of the invention meets this need acting not purely as a sequestrant, but also as a scale inhibitor and/or anticoagulant.

The copolymers of the present invention are beneficial in evaporation and distillation processes used for the treatment of salt waters, brackish waters, sea and ocean waters, brines, ets., in the recovery of water and concentration of valuable components. In the practice of the invention the copolymer is added to the water in dosages expressed in p.p.m. (parts per million by weight) of the water treated. It has been found that the dosages at which the copolymer most effectively carries out its functions range from about 0.2 to about 2,000 p.p.m. This in turn defines the minimum water solubility requirements. It is believed that copolymer of the invention must have a molecular weight not exceeding about 100,000 to function as a scale-inhibitor, however, the molecular weight should range between about 1,000 and about 25,000 for maximum effectiveness of the scale retardation.

The invention will also be described in conjunction with the specific examples, in which the parts are by weight unless otherwise specified. Molecular weights are weight average molecular weights for polymers.

EXAMPLE 1

Preparation of copolymer of fumaric acid and allyl sulfonic acid (sodium acid salt).

To a one liter round bottom 3 neck glass flask fitted with stirrer and thermometer, is added 200 grams of sodium allyl sulfonate, 250 milliliters of water and 110 grams of fumaric acid. The mixture is heated and stirred until the temperature of the solution is 90°C. Through a dropping funnel fitted to the flask, 5 milliliters of 30 percent hydrogen peroxide solution is introduced. After 1 hour an additional 5 milliliters of this peroxide catalyst is introduced. After 2 more hours of stirring at a temperature of 90°–98°C., the solution is cooled. The copolymer derived from fumaric acid and sodium allyl sulfonate is isolated by addition to an acetone-methanol mixture and dried in an oven. Infrared analysis and sulfur analysis is consistant with the formation of the expected copolymer.

For the corresponding copolymer derived from maleic acid and allyl sulfonic acid, merely substitute appropriate molar quantities of maleic acid or its anhydride.

For purposes of this disclosure, both types of these copolymers will be designated allyl sulfonic fumarate.

EXAMPLE 2

Saturated calcium sulfate solutions in water, (0.21% $CaSO_4$), were prepared. 500 ml. samples of the solution were treated with various amounts of a low molecular weight hydrolyzed polyacrylamide as described in Example 1 of U.S. Pat. No. 3,463,730 and the copolymer prepared according to the preceding Example 1 of this disclosure.

One of the samples was used as a control. All samples were then concentrated by boiling down to a volume of about 125 ml. Precipitation of calcium sulfate, of course, occurred during the evaporation and was filtered off. The calcium sulfate content of the filtrate was then determined. The results are shown in the following table:

| Additive | Percent $CaSO_4$ in Solution after Evaporation p.p.m Treatment | | |
|---|---|---|---|
| | 0 | 1 | 5 |
| Control | .12 | | |
| Hydrolyzed Polyacrylamide | | 0.14 | 0.31 |
| Copolymer of Example 1 | | 0.12 | 0.40 |

The structure of the deposited calcium sulfate was modified by the additives. The calcium sulfate was amorphous in structure as compared to the crystalline deposit obtained in the control test. The deposits formed in the presence of the polymer and copolymer were readily dislodged and removed from the walls and bottom of the containing vessel, whereas in the control test a strongly adhereing deposit formed, which was difficult to remove and had to be scraped or scrubbed off.

EXAMPLE 3

As a test vehicle, Ambler, Pa. tap water was boiled for five minutes resulting in precipitate formation. The precipitate was removed by filtration. A number of 50 ml. aliquot samples of clear filtrate were titrated to determine residual hardness, i.e., the calcium carbonate held in solution. Comparitive data resulting therefrom and showing the utility of the process of the invention in retarding scale formation is set forth in the following table.

| Additive | Calcium Carbonate in Solution (p.p.m.) p.p.m | | | | |
|---|---|---|---|---|---|
| | 0 | 1 | 2 | 5 | 10 |
| Control | 276 | — | — | — | — |
| Hydrolyzed Polyacrylamide of U.S.P. 3,463,730 Example 1 Copolymer | — | 304 | 318 | 312 | 316 |
| Example 1 | — | 312 | 332 | 340 | 344 |
| Organophosphorous hydroxyethylidine 1,1 diphosphonic acid) | — | 304 | 328 | 326 | 324 |

EXAMPLE 4

The unique property of compatibility between the scale inhibiting copolymers of the invention and a typical corrosion inhibitor — zinc sulfate — is shown in the following data. Philadelphia, Pa. municipal water was used in a Marley forced draft cooling tower. The tower was fitted with mild steel corrosion test coupons. The continuously circulated tower water was treated with a combination of 5 p.p.m. of the copolymer of Example 1 and 5 p.p.m. of zinc (as the sulfate salt). The pH was held between 7–8 using sulfuric acid.

After 7 days the coupons were examined for corrosion and the heat exchange tubes visually inspected. No scale deposits were found on the water side of the tubes. Corrosion rate was found to be 2.3 mils/year.

A control (water not treated) test run under similar conditions showed scale deposits on the tubes with a coupon corrosion rate of 26.9 mils/year.

Similar effectiveness has been observed with combinations: the copolymer of Example 1 and benzotriazole; and the copolymer of Example 1 and sodium chromates.

EXAMPLE 5

The synergistic effect of mixtures of zinc and the copolymer of Example 1 in controlling corrosion is shown by corrosion rates determined after 24 hours in mild steel coupons immersed in beakers of water through which air was continuously bubbled.

| Additive | Mild Steel Corrosion Rate (mils/yr.) | | | |
|---|---|---|---|---|
| | Dosage p.p.m. | Rate mils/yr. | Dosage p.p.m. | Rate mils/yr. |
| Blank | 0 | 12.5 | 0 | 12.5 |
| Zinc Sulfate | 9 | 11.6 | 18 | 7.8 |
| Copolymer of Example 1 | 8 | 25.0 | 16 | 20.0 |
| Copolymer of Ex. 1 plus Zinc Sulfate | 8 + 9 | 5.2 | 16.0 + 18.0 | 1.2 |

EXAMPLE 6

The effectiveness of the copolymer of Example 1 in prevention of iron oxide deposition is illustrated by the following example.

To 500 ml. of Philadelphia water is added 100 parts per million of ferrous sulfate. A solution of the scale inhibitor is added at this point. The water is boiled until 250 ml. remains. After cooling the amount of deposit formed is noted.

| Additive | Parts per million additive | Extent of deposit formed |
|---|---|---|
| Control | — | Voluminous Precipitate |
| Hydrolyzed polyacrylamide | 1.0 | Voluminous Precipitate |
| Hydrolyzed polyacrylamide | 2.0 | Some precipitate |
| Copolymer of Example 1 | 1.0 | No precipitate |

Useful aqueous mixtures employing the polymers of Example 1 include a polymer concentration of 5–15 percent with 5–15 percent zinc sulfate. This solution combination when fed into cooling tower waters at concentrations as low as 20–200 parts per million provides excellent corrosion inhibition of metal surfaces and protection from scale deposition on heat exchange surfaces.

Similarly effective results are achieved with aqueous mixtures of the copolymer with benzotriazole and other organic and inorganic water soluble inhibitors. A particularly effective solution combination employs 5–15 percent copolymer of Example 1 with 0.5–5 percent benzotriazole.

In summary, the examples demonstrate the superiority of the process of the invention to acrylic type scale inhibitors both in efficiency and uniqueness in synergizing the corrosion control of aqueous systems.

I claim:

1. A process for the control of hard, adherent scales on the walls of vessels or pipes containing an aqueous system which comprises:

adding from 20 to 200 parts per million of a water soluble copolymer which in acid form has the structure:

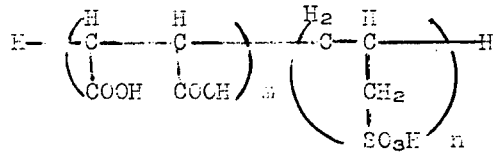

wherein $m$ and $n$ are in random order and such that the molecular weight is from about 1,000 to about 25,000 and $m$ is from 30 to 50 mol percent and $n$ is from 50 to 70 mol percent and water-soluble salts thereof.

2. The process according to claim 1 in which the water soluble salt of the copolymer is the sodium acid salt of a copolymer of allyl sulfonate fumarate having an average molecular weight of about 5,000 and with the presence of zinc ion in the aqueous system, said zinc ion derived from the addition of a water soluble zinc salt such as zinc sulfate in a weight amount of from one to three times said copolymer.

* * * * *